(12) United States Patent
Jäger et al.

(10) Patent No.: US 10,576,552 B2
(45) Date of Patent: Mar. 3, 2020

(54) ROTARY TOOL

(71) Applicant: Kennametal Inc., Latrobe, PA (US)

(72) Inventors: Horst Manfred Jäger, Nürnberg (DE);
Michael Schuffenhauer, Fürth (DE);
Jüergen Schwäegerl, Vohenstrauss
(DE); Berthold Heinrich Zeug, Fürth
(DE)

(73) Assignee: KENNAMETAL INC., Latrobe, PA
(US)

( * ) Notice: Subject to any disclaimer, the term of this
patent is extended or adjusted under 35
U.S.C. 154(b) by 0 days.

(21) Appl. No.: 15/916,903

(22) Filed: Mar. 9, 2018

(65) Prior Publication Data

US 2018/0264558 A1 Sep. 20, 2018

(30) Foreign Application Priority Data

Mar. 16, 2017 (DE) .................. 10 2017 204 452

(51) Int. Cl.
*B23B 51/02* (2006.01)
(52) U.S. Cl.
CPC .......... *B23B 51/02* (2013.01); *B23B 2251/02*
(2013.01); *B23B 2251/50* (2013.01)
(58) Field of Classification Search
CPC ........................... B23B 2251/02; B23B 51/02
See application file for complete search history.

(56) References Cited

U.S. PATENT DOCUMENTS

| | | | |
|---|---|---|---|
| 5,947,660 A | 9/1999 | Karlsson et al. | |
| 5,957,631 A | 9/1999 | Hecht | |
| 6,059,492 A | 5/2000 | Hecht | |
| 6,582,164 B1 | 6/2003 | McCormick | |
| 7,377,730 B2 | 5/2008 | Hecht et al. | |
| 7,407,350 B2 | 8/2008 | Hecht et al. | |
| 8,449,227 B2 | 5/2013 | Danielsson | |
| 8,721,235 B2 | 5/2014 | Kretzschmann et al. | |

(Continued)

FOREIGN PATENT DOCUMENTS

| | | |
|---|---|---|
| DE | 102014009241 A1 | 12/2015 |
| JP | 2016193461 | 11/2016 |

(Continued)

OTHER PUBLICATIONS

Jan. 11, 2018 First office action.

(Continued)

*Primary Examiner* — Alan Snyder
(74) *Attorney, Agent, or Firm* — Ian K. Samways

(57) ABSTRACT

The rotary tool has two coupling parts, namely a carrier and a cutting head having a front end face. The carrier has a pin seat into which a coupling pin of the cutting head is inserted. Effective stop faces are formed on the pin seat and on the coupling pin in the axial direction for axial pull-out protection. For a design that is as simple as possible, in particular in terms of grinding, a side face adjoins a respective stop face of the coupling pin and, when viewed in the axial direction, freely extends to the end face. In particular, the side face forms a torque face. For reliable clamping attachment, in particular with larger nominal diameters (D), a separating slot is made in the carrier and a clamping screw is inserted into it, both of which serve to fix the cutting head in the pin seat.

22 Claims, 3 Drawing Sheets

(56) References Cited

U.S. PATENT DOCUMENTS

| | | |
|---|---|---|
| 8,840,347 B2 | 9/2014 | Aare |
| 8,864,425 B2 | 10/2014 | Osawa et al. |
| 9,028,180 B2 | 5/2015 | Hecht |
| 9,205,498 B2 | 12/2015 | Jaeger |
| 9,296,049 B2 | 3/2016 | Schwaegerl et al. |
| 9,468,979 B2 | 10/2016 | Hecht |
| 10,207,336 B2 | 2/2019 | Schwägerl et al. |
| 2008/0193238 A1* | 8/2008 | Hecht .................... B23B 51/02 408/230 |
| 2009/0116920 A1 | 5/2009 | Bae |
| 2012/0315101 A1 | 12/2012 | Osawa et al. |
| 2013/0266389 A1 | 10/2013 | Hecht |
| 2014/0169892 A1 | 6/2014 | Hecht |

FOREIGN PATENT DOCUMENTS

| | | |
|---|---|---|
| WO | 2008072840 | 6/2008 |
| WO | 2013150517 | 10/2013 |

OTHER PUBLICATIONS

Sep. 11, 2016 First office action P15-06058-DE-NP (DE App. No. 102015220791.9).

Nov. 2, 2017 Office action P15-06058-US-NP (U.S. Appl. No. 15/331,615).

Jun. 6, 2018 Final Office Action P15-06058-US-NP (U.S. Appl. No. 15/331,615).

Jan. 29, 2019 Office Action P15-06058-CN-NP (CN App. No. 201610915840.X).

Aug. 27, 2019 Office Action P15-06058-CN-NP (CN App. No. 201610915840.X).

* cited by examiner

ROTARY TOOL

RELATED APPLICATION DATA

The present application claims priority pursuant to 35 U.S.C. § 119(a) to German Patent Application Number DE 102017204452.7 filed Mar. 16, 2017 which is incorporated herein by reference in its entirety.

FIELD

The invention relates to a rotary tool, in particular, a drill bit.

BACKGROUND

Among the modular rotary tools, it is possible to distinguish between two different types. In a first type, as can be seen, for example, in WO 2008/072840 A2, the torque faces extend radially outward up to an outermost periphery of the cutting head, also referred to as the drill bit bit body clearance. According to a second variant, the torque faces are formed directly on the coupling pin as lateral surfaces thereof that cooperate with corresponding inner lateral surfaces of the fastening segments.

Both the torque faces and the clamping faces of the cutting head as well as those of the carrier are located across from each other in pairs when in a coupled state, i.e. when the cutting head is inserted into the carrier.

For axial pull-out protection, approximately horizontally-extending stop faces are often formed on the coupling pin that cooperate with corresponding stop faces of the carrier to ensure form-fit securing in the axial direction for the cutting head. This form-fit securing prevents the cutting head from being pulled out of the carrier in the axial direction, for example when pulling the rotary tool back out of the drilled hole after a drilling operation. In WO 2008/072840 A2, a circumferential groove in the form of a recess is formed in the coupling pin to form this axial pull-out protection.

JP 2016 193461 A discloses a further rotary tool of this type in which a clamping screw is provided in the carrier to clamp the cutting head. On each of the fastening segments, a lock that projects in the transverse direction is formed that engages into a recess in the coupling pin.

SUMMARY

On this basis, the aim of the invention is to specify a modular rotary tool which realizes an axial pull-out protection that is as simple as possible to manufacture and simultaneously has a good clamping force.

The problem is solved according to the invention by means of a rotating tool having the features of claim 1. Advantageous developments are set forth in the dependent claims.

The rotary tool extends along an axis of rotation in the axial direction and has a carrier and a cutting head with a front end face. The cutting head is, as described in the introduction, attached to the carrier in an exchangeable manner by turning it. On its end face, the cutting head has main cutting edges that extend from a center outward. Adjoining these are clearance faces that usually terminate in flutes that are assigned to a respective subsequent main cutting edge. Flutes that are continued in the further course of the carrier are usually already made in the cutting head itself. The flutes are usually helical. On its end face, the carrier typically has two fastening segments located opposite each other that limit a pin seat into which a coupling pin of the cutting head is inserted, the coupling pin in particular forming a clamping with the carrier when the cutting head is turned relative to the carrier such that a press fit is thus formed between the coupling pin and carrier on mutually corresponding clamping faces. In general, mutually corresponding lateral surfaces that at least serve to radially center the coupling pin in the carrier, but preferably to transmit the radial clamping force, are formed on the coupling pin and on the fastening segments. Furthermore, mutually corresponding torque faces are formed on the cutting head and on the carrier for transmitting a torque.

With regard to axial pull-out protection, effective stop faces are formed on the pin seat and on the coupling pin in the axial direction such that a form fit that is effective in the axial direction is formed when the cutting head is inserted into the carrier. To make it possible to manufacture the cutting head with the stop faces in as simple a manner as possible, a side face that, when viewed in the axial direction, extends toward the end face adjoins a respective stop face of the coupling pin in the axial direction. The stop face therefore makes a transition into the side face while forming a typically rounded corner region. In this context, "extending toward the end face" means that the side face extends toward the end face as a flat surface starting from a radially inner end of the stop face, i.e. starting from the corner region, without abutting a transverse structure like a segment, a groove or a substantially right-angle overhang, as is the case, for example, with a ground-in groove. In this case, "substantially right-angle" means that the side face does not abut a transverse face of an overhang that extends to the axis of rotation at an angle of 90°+1-45°. A face inclined slightly relative to the axis of rotation is possible without the grinding of the side face becoming excessively difficult as a result.

In a preferred embodiment, the side face extends freely at its frontmost end toward the end face, i.e. it is not covered by a part of the cutting head, in particular it is not covered by a part of the end face in the manner of an overhang (when viewed in the axial direction, i.e. when projecting the end face in the axial direction).

Preferably, the side face terminates at the end face, i.e. it extends up to the end face. Alternatively, another face that runs up to the end face adjoins the side face.

In contrast to the known pull-out protections in which the stop faces are formed by introducing a radial recess or a radially ground-in groove, the particular advantage of a simple grinding-in is achieved by the side face that, in particular, extends freely toward the end face. Therefore, no right-angle overhangs, or at least no substantially right-angle overhangs, i.e. partial regions of the cutting head projecting toward the end face, need to be taken into consideration.

The cutting head and its seat on the carrier side are preferably designed as described in DE 10 2015 220 791, which was not published at the time of application. In addition, the carrier has a separating slot and a clamping screw below the pin seat. It crosses through the separating slot and serves to mutually lock two halves of the pin seat. Each half has one of the two fastening segments. By tightening the clamping screw, the two fastening segments are braced against each other, and the clamping pin inserted between the fastening segments is clamped reliably and securely.

Compared to a pure force fit, the required clamping force is therefore at least partially and preferably exerted exclusively via the clamping screw. As a result of this, the requirements for the accuracy of fit between the coupling pin and coupling seat are reduced compared to a press fit. This is, in particular, advantageous for larger nominal diameters of the rotary tool.

In an expedient embodiment, the pin seat is oversized compared to the coupling pin. Here, "oversized" means that an inner width of the coupling seat is greater than an outer width of the coupling pin in the area of the respective corresponding lateral surfaces provided for the clamping (clamping faces). In particular, an outer diameter of the coupling pin is smaller than an inner diameter of the coupling seat. On the one hand, the oversize allows for simpler manufacturing. On the other hand, this makes it easy to insert, in particular screw in, the cutting head into the coupling seat.

The oversize is preferably 0.1 mm to 0.3 mm and, in particular, 0.1 mm to 0.2 mm.

Furthermore, the nominal diameter of the rotary tool is greater than 12 mm and, in particular, greater than 16 mm. The nominal diameter is preferably within the range of 16 mm to 40 mm.

The stop faces preferably form upper boundary surfaces of at least one partial region of the coupling pin, and preferably of the entire coupling pin. The coupling pin therefore ends with the stop faces. The coupling pin itself, with its lateral surfaces arranged circumferentially, in particular forms the clamping faces for clamping fastening. These are expediently oriented parallel to the axial direction, so they do not form an undercut with the corresponding faces on the carrier.

With regard to manufacturing that is as simple as possible, the respective side face is formed by grinding, i.e. the side faces are formed by a ground face. The side face is expediently designed as a flat ground face. The ground face is, for example, formed by simply advancing a grinding disk with its flat side.

At the same time, the respective side face expediently forms the torque face or at least a part thereof, the torque face preferably extending up to the outermost periphery of the cutting head, i.e. up to the body clearance.

Generally, the torque face preferably extends up to or almost up to the end face. As a result of this, the torque is transmitted at an axially front position at which the cutting forces also occur. The torque forces are therefore transmitted directly to the fastening segments and thus onto the carrier. This prevents torsional stress on the cutting head which otherwise occurs if the torque faces are axially spaced from the end face and the cutting edges, for example formed at the rear region of the coupling pin.

The side face is preferably generally defined by a transverse direction that extends in a horizontal direction perpendicular to the axial direction, and by a longitudinal direction. In particular, this corresponds to the axial direction. The side face thus runs parallel to the axial direction.

Preferably, exactly two side faces are formed, these side faces running parallel or at least largely parallel to each other. This forms a very slender cutting head. This saves material for the cutting head, in particular in the case of larger nominal diameters.

Alternatively, the longitudinal direction is inclined relative to the axial direction by an angle of inclination that differs from zero, i.e. the longitudinal direction does not run parallel to the axial direction. The angle of inclination is usually expediently between 10° and 25°. When viewing or projecting in the axial direction, the stop face does not project beyond the end face, i.e. the end face completely covers the stop face.

In an expedient embodiment, the side face extends in the direction of a center of the cutting head and extends toward a flute. Due to the typically curved flute, the side face therefore also terminates at the flute in the radial direction such that it can therefore also be inserted toward the flute through grinding without a problem.

An edge designed as a minor cutting edge usually runs along the flute. In a preferred embodiment, this minor cutting edge is now behind a plane defined by the side face, specifically in such a manner that this plane defined by the side face does not touch the cutting head in the area of the minor cutting edge. This embodiment makes it possible to use the grinding disk to easily grind across the entire diameter of the cutting head without the risk of the minor cutting edges being affected. On the whole, this embodiment therefore results in the particularly simple insertion of the axial pull-out protection by simple, one-step grinding.

Clamping faces for transmitting the radial clamping force are generally formed on the coupling pin. These are usually of curved design, i.e. run—when viewed in cross section perpendicular to the axis of rotation—along a curved line, in particular along an arcuate line. The clamping faces are therefore typically designed as partly cylindrical faces or partly conical faces.

BRIEF DESCRIPTION OF THE DRAWINGS

An exemplary embodiment of the present invention is explained in greater detail below based on the figures. These show the following—in some cases using simplified illustrations.

DETAILED DESCRIPTION

Figure 1:
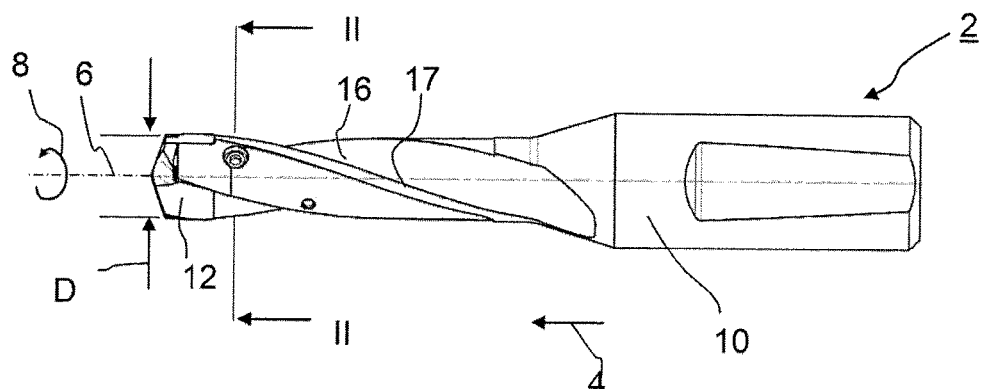
FIG. 1 a side view of a modular rotary tool that is designed as a drill bit and has a cutting head inserted into a carrier, FIG. 2 a sectional view along the section line II-II in FIG. 1

The rotary tool 2 illustrated in the figures is designed as a modular drilling tool. It extends in an axial direction 4 along an axis of rotation 6. During normal operation, rotary tool 2 rotates about axis of rotation 6 in direction of rotation 8, which simultaneously defines a circumferential direction.

The rotary tool 2 is composed of a carrier 10 and a cutting head 12 that can be exchangeably attached thereto. In particular, FIGS. 4A to 4C and FIGS. 5A to 5C show the design of cutting head 12. Cutting head 12 has main cutting edges not described in more detail here that are usually connected to each other in the center on a drill bit front across a chisel edge and extend radially outward. Counter to direction of rotation 8, end-face main cutting edges that are part of a frontal end face 13 of cutting head 12 adjoin the main cutting edges. End face 13 is usually formed by the main free faces as well as surface areas at the center of the cutting head where the main cutting edges are usually connected to each other via a chisel edge. On its circumferential side, the cutting head 12 comprises a rear surface 14 which is interrupted by opposite flutes 16. They preferably already start in cutting head 12 and transition into carrier 10. In the exemplary embodiment, the flutes 16 extend approximately helically. Cutting head 12, and therefore rotary tool 2, has a nominal diameter D. It is, in particular, between 16 mm and 40 mm.

Carrier 10 has a grooved shank region on which minor cutting edges 17 that extend along flutes 16 and start on cutting head 12 are usually located. A non-grooved clamping section, with which rotary tool 2 is clamped into a machining tool, usually adjoins the grooved shank region of carrier 10.

Carrier 10 (see FIG. 3, FIGS. 4A-4C) has two approximately diagonally opposed fastening segments 18 on its end face that are interrupted by flutes 16. A pin seat 20, into which a coupling pin 38 of cutting head 12 is inserted, is formed between fastening segments 18.

Cutting head 12 is clamped to carrier 10 using a clamping screw 102. For the clamping, a separating slot 104 is inserted into carrier 10. It extends starting from a base 106 of pin seat 20 counter to longitudinal direction 4. Separating slot 104 also extends along the entire diameter of carrier 10 in a transverse direction perpendicular to the longitudinal direction 4 such that two halves 108 of carrier 10 separated by separating slot 104 are formed. Each half 108 has one of the fastening segments 18.

Figure 2:
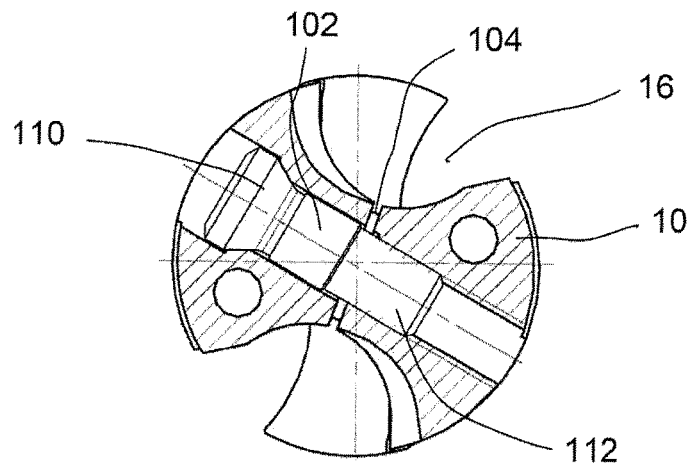
Figure 3:
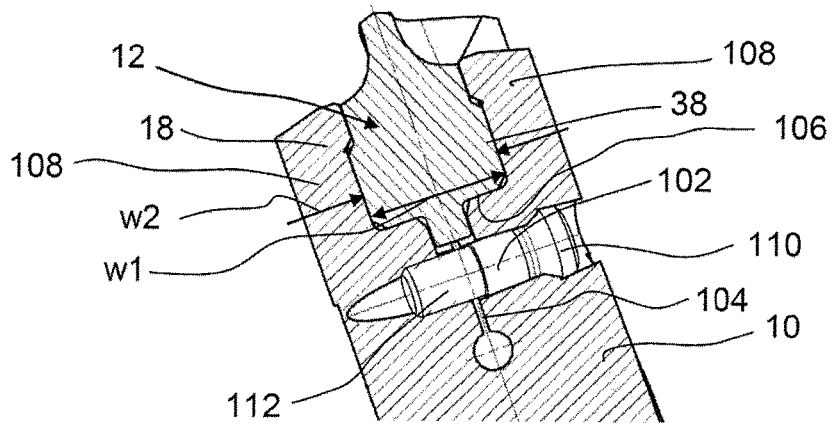
FIG. 3 a longitudinal sectional view in the area of the cutting head

As can be seen in particular in FIG. 2, separating slot 104 extends between the opposite flutes 60. In particular, it also crosses axis of rotation 6.

Clamping screw 102 is oriented transversely to separating slot 104 and, in particular, perpendicular to longitudinal direction 4 in a horizontal plane.

Clamping screw 102 has a screw head 110 that is located in a corresponding head seat in carrier 10. Clamping screw 102 has a threaded shank 112 with which it is screwed into the half 108 of carrier 10 that is opposite the head seat. By turning clamping screw 102, the two halves 108 and thus the two fastening segments 18 are therefore braced against each other, i.e. in each case moved in the direction of axis of rotation 8. As a result of this, a clamping force is exerted on the cutting head inserted into pin seat 20.

In the starting condition, i.e. when clamping screw 102 is not inserted and the two halves 108 are not braced against each other, the two fastening segments 18 have a (minimum) inner width w1 relative to each other and coupling pin 38 has a (maximum) outer width w2. In the area of minimum inner width w1 and maximum outer width w2, coupling pin 38 and the fastening segments rest on each other in a clamping manner in the inserted state. Minimum inner width w1 is greater than maximum outer width w2. The difference between inner width w1 and outer width w2 defines an oversize. The oversize is, in particular, in the region between 0.1 and 0.2 mm.

The special design of cutting head 12 is explained in more detail below using FIGS. 4A to 4C and 5A to 5C. Mutually corresponding elements on carrier 10 are indicated by the letter a, and those on carrier 12 are indicated by the letter b. Separating slot 104 of carrier 10 is not shown in FIGS. 4A to 4C.

In the exemplary embodiment, cutting head 12 is arranged between fastening segments 18 without resting on them—when viewed in longitudinal direction 4. Fastening segments 18 only have one approximately horizontal transverse surface, namely a free end face. Coolant channels emerge from this free end face.

A respective lateral wall of fastening segments 18 forms a torque face 30a in each case. Torque face 30a is generally defined by a transverse direction 34 as well as by an axial direction 4. Transverse direction 34 is oriented perpendicular to axial direction 4. The torque faces 30a of the two fastening segments 18 preferably run in the same transverse direction 34 and thus at least substantially parallel to each other.

For the clamping attachment of cutting head 12 in carrier 10, cutting head 12 has a clamping or coupling pin 38 that corresponds to pin seat 20. On its lateral side, coupling pin 38 has clamping sections 32b opposite each other in pairs that cooperate with corresponding clamping sections 32a of pin seat 20.

Figure 5A:
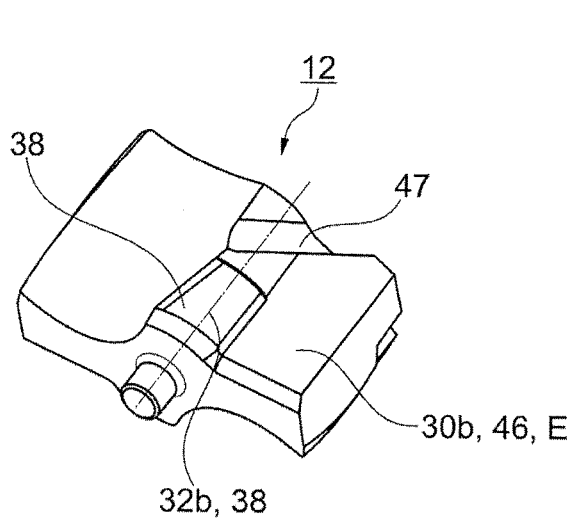
Figure 5B:
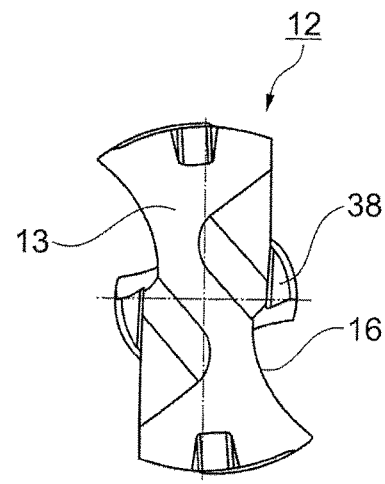
Figure 5C:
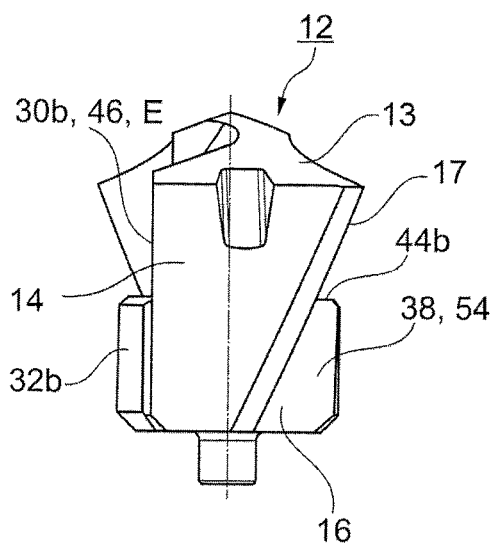

As can be seen in particular from the top view of FIG. 5B, cutting head 12 has an approximately plate-shaped middle portion with diagonally opposed, preferably parallel torque faces 30b and flutes 16, coupling pin 38 projecting past this middle portion on both sides. Counter to axial direction 4, an insertion or centering pin 42 is adjoined that, however, does not form any clamping with the carrier in the inserted state.

For an axial pull-out protection, mutually corresponding stop faces 44a, b that form an upper boundary surface of coupling pin 38 are formed on pin seat 20 as well as on coupling pin 38. In particular, they run horizontally, i.e. perpendicular to axial direction 4. Alternatively to the exactly horizontal orientation, they can also be designed to be slightly inclined, for example at an angle of up to 30°.

Of particular importance is that stop faces 44b of coupling pin 38 are exposed by a kind of clearance. To this end, a side face 46 that is preferably designed as a particularly flat ground face adjoins stop face 44b in axial direction 4—preferably while forming a curve. In particular, side face 46 runs precisely in axial direction 4. As can especially be seen in the top view according to FIG. 5B, stop face 44b therefore projects beyond end face 13, i.e. is not covered by it.

Side face 46 extends toward end face 13 and extends freely at its end. When viewed along the axial direction (see for example FIG. 5C), side face 46 is therefore not covered by end face 13. Alternatively to the side face 46 that is continuously flat up to end face 13, it can initially make a transition into an end surface that then extends toward end face 13. It runs in such a way that side face 46 when viewed counter to axial direction 4 is not covered by end face 13.

In addition, side face 46 preferably also extends beyond stop face 44b in transverse direction 34 and, in particular, up to the outer periphery, i.e. to land 14 of cutting head 12. At the same time, side face 46 also forms torque face 30b.

Torque faces 30a, b preferably extend across the entire axial length of fastening segments 18. Torque face 30a forms a continuously flat surface. In principle, it is also possible for it to be inclined obliquely, as described before for side surface 46.

Overall, side face 46 defines a plane E that is oriented in such a way that it—when viewed in transverse direction 34—freely terminates in an adjacent flute 16 on the one hand and is further oriented in such a way that it does not touch or intersect the minor cutting edge 17 that limits respective flute 16. This ensures that when side face 46 is ground, opposite minor cutting edge 17 is not damaged.

Figure 4A:
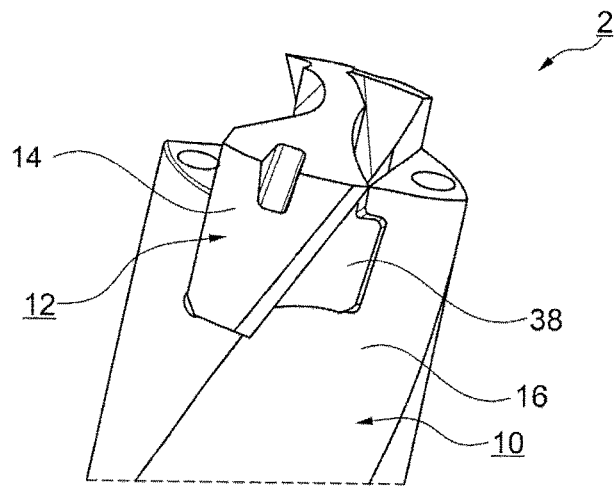
FIG. 4A,4B,4C various illustrations of the rotary tool in the area of the cutting head with the cutting head inserted (FIG. 4A) or in exploded illustrations (FIGS. 4B,4C), as well as FIG. 5A to 5C various views of the cutting head

In the area of the chisel edge, a so-called point thinning 47 is usually provided, as shown, for example, in FIG. 4A as a central surface region next to flute 16 and above torque face 30b. In this case, this point thinning 47 is not assigned to end face 13.

Figures 4B, 4C:
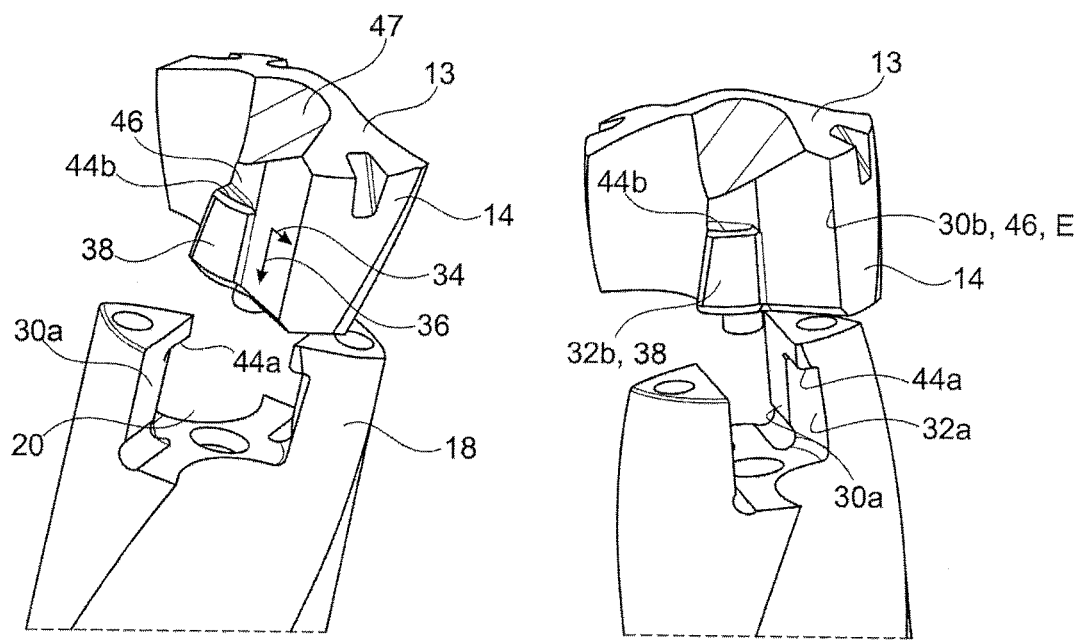

Corresponding to stop face 44b, carrier 10 has a carrier-side stop face 44a that is designed as a step-shaped overhang (see FIG. 4C). In this respect, stop face 44a and clamping sections 32a form a seat for the coupling pin. The seat is inserted into an otherwise flat wall region of fastening pin 18 as a recess shaped like a partial truncated cylinder or a partial truncated cone. As a result of this, an overhang that is directed radially inward and accordingly projects beyond clamping section 32a is formed on the end of fastening segment 18.

When cutting head 12 is screwed into carrier 10, the cutting head is generally screwed in counter to the usual drilling direction of rotation 8 until mutually corresponding torque faces 30a, 30b come to rest against each other.

The invention claimed is:

1. A rotary tool which extends in an axial direction along an axis of rotation, the rotary tool comprising:
    a carrier; and
    a cutting head which is interchangeably attached to the carrier and comprises a front end face;
    the carrier comprising fastening segments which define a pin seat;
    the cutting head comprising a coupling pin which is insertable into the pin seat via rotating the cutting head relative to the carrier;
    the pin seat and the coupling pin each comprising stop faces, wherein the stop faces of the pin seat and of the coupling pin interact with each other for axial pull-out prevention;
    wherein the coupling pin includes a side face which includes a front end portion;
    the side face extending, generally axially, to the front end portion thereof and toward the front end face;
    wherein, when viewed with respect to the axial direction, the front end face does not overlap the front end portion of the side face;
    at least a portion of the side face being disposed axially adjacent to a respective stop face of the coupling pin;
    wherein, at a radially inner end thereof, the respective stop face of the coupling pin transitions uniquely into the at least a portion of the side face.

2. The rotary tool according to claim 1, wherein:
    the coupling pin and the fastening segments each comprise lateral surfaces; and
    the lateral surfaces of the coupling pin and of the fastening segments interact with each other to radially center the coupling pin or to transmit a radial clamping force.

3. The rotary tool according to claim 2, wherein:
    the pin seat is oversized with respect to the coupling pin;
    wherein, at the lateral surfaces of the coupling pin and of the fastening segments, an inner width of the pin seat is greater than an outer width of the coupling pin.

4. The rotary tool according to claim 3, wherein the pin seat is oversized in a range between 0.1 mm and 0.3 mm, in comparison with the coupling pin.

5. The rotary tool according to claim 4, wherein the pin seat is oversized in a range between 0.2 mm and 0.3 mm, in comparison with the coupling pin.

6. The rotary tool according to claim 2, wherein the lateral surfaces extend in a direction which is parallel to an axial direction.

7. The rotary tool according to claim 2, wherein:
    the cutting head and the carrier each comprise torque surfaces; and
    the torque surfaces of the cutting head and of the carrier interact with each other to transmit a torque between the carrier and the cutting head.

8. The rotary tool according to claim 7, wherein:
    the carrier comprises a separating slot disposed axially below the pin seat;
    the fastening segments are respectively disposed at either side of the separating slot; and
    the rotary tool comprises a clamping screw which is inserted into the carrier and crosses through the separating slot.

9. The rotary tool according to claim 1, wherein:
    the cutting head and the carrier each comprise torque surfaces; and
    the torque surfaces of the cutting head and of the carrier interact with each other to transmit a torque between the carrier and the cutting head.

10. The rotary tool according to claim 9, wherein the side face is formed as one of the torque surfaces.

11. The rotary tool according to claim 9, wherein one of the torque surfaces of the cutting head:
    is disposed adjacent to a corresponding one of the stop faces of the coupling pin; and
    extends to an outermost circumference of the cutting head.

12. The rotary tool according to claim 1, wherein:
    the carrier comprises a separating slot disposed axially below the pin seat; and
    the fastening segments are respectively disposed at either side of the separating slot.

13. The rotary tool according to claim 12, comprising a clamping screw which is inserted into the carrier and crosses through the separating slot.

14. The rotary tool according to claim 1, wherein the rotary tool has a nominal diameter of greater than 16 mm.

15. The rotary tool according to claim 1, wherein the side face is a flat ground face.

16. The rotary tool according to claim 1, wherein the side face extends:
    over an axial direction; and
    over a transverse direction which is perpendicular to the axial direction.

17. The rotary tool according to claim 1, wherein:
    the side face is a first side face; and
    the coupling pin further includes a second side face extending, generally axially, toward the front end face;
    wherein the first and second side faces run in parallel with respect to one another.

18. The rotary tool according to claim 1, wherein:
    the coupling pin includes a flute; and
    the side face terminates at the flute.

19. The rotary tool according to claim 1, wherein the stop faces forms an axially upper boundary surface of the coupling pin.

20. The rotary tool according to claim 19, wherein:
    the cutting head includes a middle portion; and
    the coupling pin projects past the middle portion, in a generally radial direction with respect to a longitudinal axis of the cutting head.

21. The rotary tool according to claim 1, wherein the rotary tool is a drill.

22. The rotary tool according to claim 1, comprising a rounded corner region where the respective stop face of the coupling pin transitions uniquely into the at least a portion of the side face.

* * * * *